Figure 1:
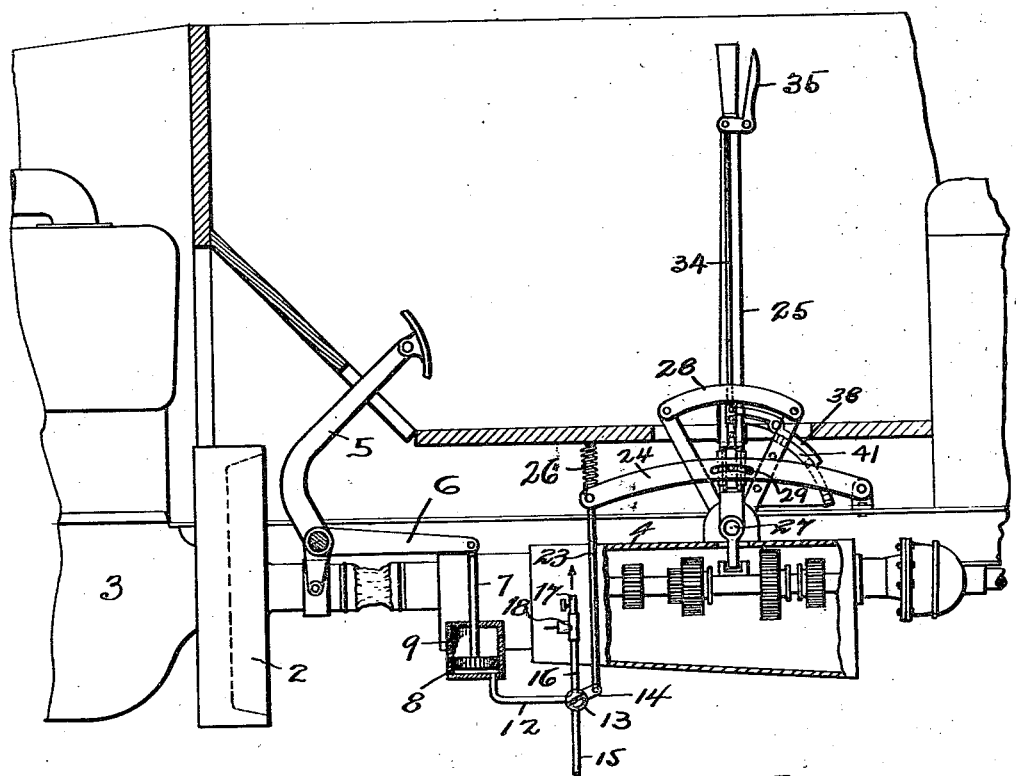

H. C. RANDALL.
GEARING.
APPLICATION FILED OCT. 13, 1913.

1,179,037.

Patented Apr. 11, 1916.
2 SHEETS—SHEET 1.

WITNESSES:
H. G. Prut.
P. S. Pidwell

INVENTOR.
H. C. RANDALL
BY Miller White
his ATTORNEYS.

H. C. RANDALL.
GEARING.
APPLICATION FILED OCT. 13, 1913.

1,179,037.

Patented Apr. 11, 1916.
2 SHEETS—SHEET 2.

WITNESSES:

INVENTOR.
H. C. RANDALL
BY Miller & White
his ATTORNEYS.

UNITED STATES PATENT OFFICE.

HORATIO C. RANDALL, OF SAN FRANCISCO, CALIFORNIA.

GEARING.

1,179,037.      Specification of Letters Patent.      Patented Apr. 11, 1916.

Application filed October 13, 1913. Serial No. 794,855.

*To all whom it may concern:*

Be it known that I, HORATIO C. RANDALL, a citizen of the United States, and a resident of the city and county of San Francisco, State of California, have invented certain new and useful Improvements in Gearing, of which the following is a specification.

The invention relates to motor vehicles which are provided with a clutch between the engine and the transmission mechanism, and particularly to such vehicles which are provided with transmission gears for producing various vehicle speeds in proportion to the speed of the engine.

The object of the invention is to provide power operated means for operating the clutch.

Another object of the invention is to provide means which operate to disengage the clutch before the transmission gears can be shifted.

The invention possesses other advantageous features, which, with the foregoing, will be set forth at length in the following description, where I shall outline in full that form of the invention which I have selected for illustration in the drawings accompanying and forming part of the present specification. The novelty of the invention will be included in the claims succeeding said description. From this it will be apparent that I do not limit myself to the showing made by said drawings and description as I may adopt many variations within the scope of my invention as set forth in said claims. The arrangement of the parts may be varied considerably, and the present embodiment illustrates the invention as it is embodied in my first model, it being understood that many refinements will be made in the commercial application of the device, but the present embodiment is sufficient to illustrate the principle and mode of operation of the apparatus.

Figure 5:
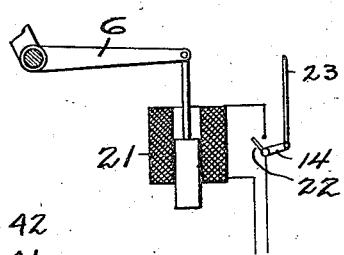
Figure 4:
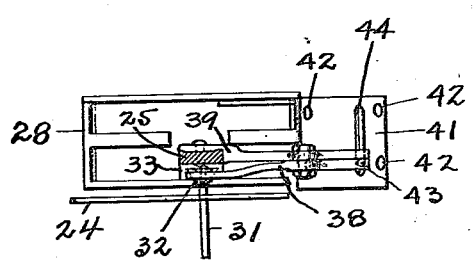
Figure 2:
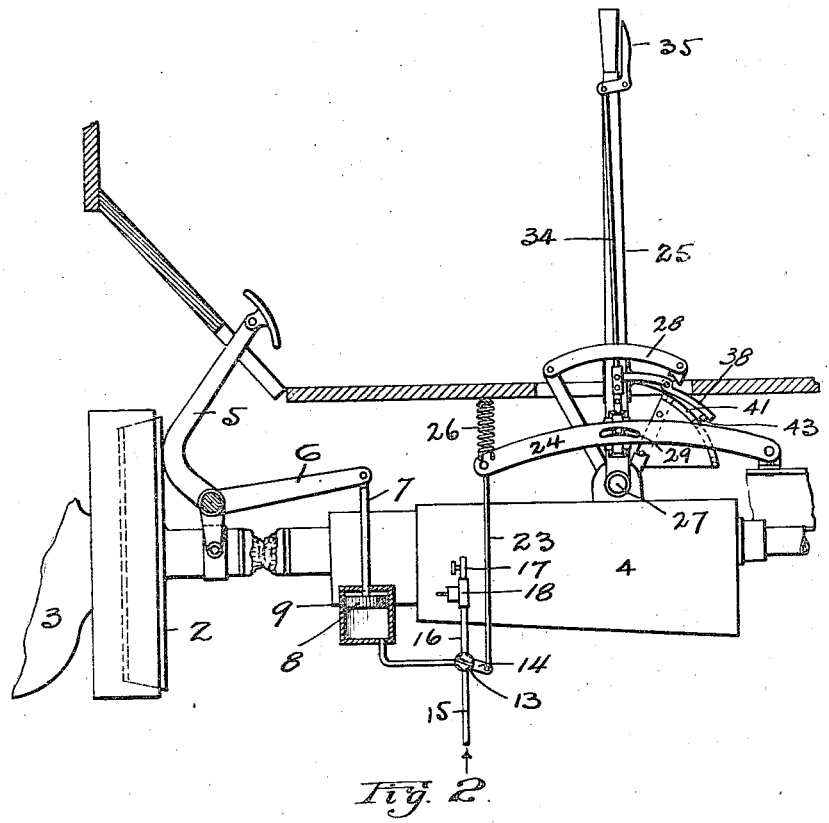
Figure 3:
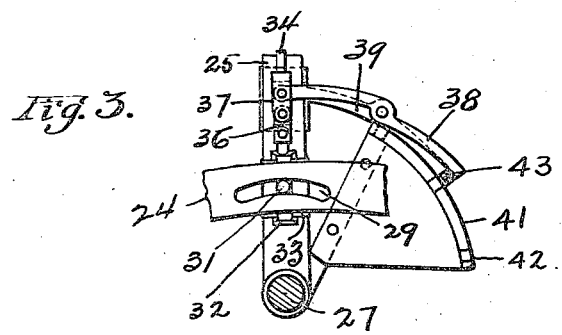

Referring to said drawings: Figure 1 is a partial view partly in section of an automobile equipped with the apparatus of my invention, the various parts being shown in inoperative position. Fig. 2 is a similar view showing the parts in operative position. Fig. 3 is a view on a larger scale of those parts of the apparatus arranged adjacent the lower end of the gear shift lever. Fig. 4 is a top view of the parts shown in Fig. 3. Fig. 5 is a detail of a construction employing electricity as the motive power.

The apparatus of my invention is arranged to operate the clutch by power operated means and means are provided connecting the gear shift lever with the control of the power operated means, so that the clutch must be disengaged before the gear shift lever can be operated. This is accomplished without in any way interfering with the usual pedal operation of the clutch. Means are provided for locking the gear shift lever in either or all of its operative positions and in the neutral position and the operation of unlocking the lever, causes the clutch to be disengaged.

The clutch 2, which is interposed between the engine 3 and the transmission mechanism 4, is provided with the usual foot lever 5, which when depressed, disengages the clutch. Connected to the foot lever 5 or to the operating mechanism between the foot lever and the clutch is a lever 6, to which is pivoted the piston rod 7 of the piston 8, which is disposed within the cylinder 9, securely attached to some relatively stationary part of the vehicle or transmission case. Communicating with the lower end of the cylinder 9 is a conductor 12, in which is arranged a three-way valve 13 arranged to be operated by the lever 14. Communicating with the valve is a conductor 15, extending to a compressed air reservoir on the vehicle, and an exhaust conductor 16. The exhaust conductor is provided on its end with a valve 17 for controlling the discharge opening, thereby regulating the speed of the piston in the cylinder on the down stroke, thereby regulating the speed with which the clutch moves into engagement. The clutch, of course, is provided with the usual springs for forcing it back into engagement when the pressure on the foot pedal 5 or in the cylinder 9 is released. Arranged in conductor 16 is a check valve 18, which operates to allow air to freely enter conductor 16 when the pressure therein is below atmospheric pressure, but which is closed at other times. When it is desirable to operate the clutch by the foot pedal air readily enters the cylinder, through the check valve 18, so that very little effort is necessary to overcome the resistance offered by the piston 8.

Instead of employing compressed air and the piston, cylinder and valve arrangement, a solenoid 21 energized by a source of current on the vehicle can be used, in which construction the cylinder is displaced by the solenoid and the valve by a switch 22, which is operated by the lever 14.

Attached to the lever 14 is a link 23, which is attached at its upper end to a lever 24, pivoted at its opposite end to some stationary part of the vehicle and which lies adjacent the lower end of the gear shift lever 25. The movable end of the lever 24 is normally held in the raised position, as shown in Fig. 1, by some suitably placed spring, such as the tension spring 26. The gear shift lever 25 is mounted upon the cross shaft 27 and engages in the slotted plate 28, sometimes known as an H-plate. The slots in the plate indicate the different positions of the gear shift lever for various gear ratios.

The lever 24 is disposed adjacent the lower end of the gear shift lever and lies preferably in a plane at right angles to the shaft 27. Formed in the lever 24 is a curved slot 29 concentric with the shaft 27, in which slot is disposed a pin 31 which is fastened to a slide 32, which is slidable in the guide 33 attached to the gear shift lever. The slide 32 is connected to the rod 34 which is connected at its upper end to grip or lever 35 arranged in a suitable location on the gear shift lever. The grip 35 is so arranged that when it is gripped and pulled by the hand, the rod 34 is depressed, as is shown in Fig. 2. The depression of the rod 34 causes a depression of pin 31 and lever 24, thereby operating the valve 13 or switch 22 to cause the clutch to be disengaged.

Means are provided for preventing the movement of the gear shift lever to vary the speed ratio, until the grip 35 has been operated and the clutch disengaged. Arranged between the slide 32 and the rod 34 is the link 36 which is pivoted to the slide 32 and to the foot 37 of the rod 34. Pivoted to the foot 37 is a lever 38 which is fulcrumed on the bracket 39 secured to the gear shift lever. The rear end of the lever 38 is preferably formed concentric with the shaft 27 and normally lies on the concentric plate 41. The concentric plate 41 is provided with a plurality of apertures 42 which register respectively with the pin 43 on the lever 38 when the gear shift lever is in the neutral position or either of its operative positions. The neutral position aperture 44 is preferably made elongated in form to permit of a transverse shifting of the gear shift lever without operating the clutch. The pin 31 on slide 32 is of sufficient length that it is not drawn out of the slot 29 when the lever 25 is shifted transversely. Therefore, whenever the gear shift lever is in the neutral position and the clutch is engaged, the pin 43 seats in aperture 44 and prevents the movement of the gear shift lever toward any operative position, and when the gear shift lever is in any operative position and the clutch is engaged, the pin 43 seats in the respective aperture 42 and prevents a movement of the lever. The lever 38 is moved to withdraw the pin by the grip 35, the movement of which causes a simultaneous disengagement of the clutch, so that the clutch must be disengaged before the gear can be shifted. Should the gear shift lever be in such position that the pin 43 will not register with any of the apertures in the plate 41 and the grip should be released, the lever 38 remaining in unlocked position will hold the lever 24 depressed and the clutch open, thereby preventing any accidental engagement of the clutch at an improper time.

I claim:

1. In a motor vehicle, an engine, a transmission mechanism, a clutch between the engine and transmission mechanism, a gear shift lever, power operated means for disengaging said clutch, a device for controlling said power operated means, a lever connected to said device, a slide on the gear shift lever, and means connecting said slide and said lever.

2. In a motor vehicle, an engine, a transmission mechanism, a clutch between the engine and transmission mechanism, a gear shift lever, power operated means for disengaging said clutch, a device for controlling said power operated means, a lever connected to said device provided with a slot arranged concentrically with the center of rotation of said gear shift lever, a slide on said gear shift lever, a pin on said slide engaging in said slot, and means on said gear shift lever for moving said slide.

3. In a motor vehicle, an engine, a transmission mechanism, a clutch between the engine and transmission mechanism, a gear shift lever, power operated means for disengaging said clutch, a device for controlling said power operated means, a lever connected to said device and arranged adjacent said gear shift lever, a slide on said gear shift lever engaging said second lever, means connected to said slide for locking the gear shift lever in position, and means for moving said slide to disengage said lock and operate said control device.

4. In a motor vehicle, an engine, a transmission mechanism, a clutch between the engine and transmission mechanism, a pivoted gear shift lever, a plate concentric with said pivot having a plurality of spaced apertures therein, a lever on said gear shift lever, a pin on said second lever adapted to engage in said apertures when the gear shift lever is in its neutral or operative positions, power operated means for disengaging said clutch, a device for controlling said power operated means, and means on the gear shift lever for simultaneously operating said control device to disengage said clutch and to withdraw said pin from the aperture in which it is seated.

In testimony whereof, I have hereunto set my hand at San Francisco, California, this 4th day of October, 1913.

HORATIO C. RANDALL.

In presence of—
  H. G. Prost,
  P. S. Pidwell.